Patented Dec. 25, 1928.

1,696,432

UNITED STATES PATENT OFFICE.

HENRY DREYFUS, OF LONDON, AND CLIFFORD IVAN HANEY, OF SPONDON, NEAR DERBY, ENGLAND, ASSIGNORS TO CELANESE CORPORATION OF AMERICA, A CORPORATION OF DELAWARE.

PROCESS OF CONCENTRATING LOWER-ALIPHATIC-ACID SOLUTIONS.

No Drawing. Application filed January 22, 1927, Serial No. 162,939, and in Great Britain November 30, 1926.

This invention relates to improvements in the manufacture of concentrated lower aliphatic acids from their solutions and particularly their dilute solutions of whatever origin and particularly to the manufacture of concentrated acetic acid from dilute acetic acid, such as crude pyroligneous acid, acetic acid obtained as a waste product in acetylation processes such as the acetylation of cellulose, fermentation acid, etc.

It is known (see for example British specification 20,125 of 1907) to extract such dilute acetic acid with the aid of liquids insoluble or relatively insoluble in water such as ether, ethyl acetate, benzol, chloroform, cresol or other phenols or tar oils of high boiling point etc.

When extracting acetic acid from its aqueous solutions with solvents such as ether, ethyl acetate, chloroform and the like, it is found that acetic acid of concentration only up to about 70% is obtainable, due to the fact that water is soluble to some extent in these solvents. On the other hand if liquids such as benzol, petroleum ether or other petroleum fractions, anthracene oil and the like be employed, i. e. liquids in which water is practically insoluble, the efficiency of the extraction is very low. For example, if a 20–25% aqueous solution of acetic acid be extracted with petroleum ether, only about 2–4% of the acid originally in the aqueous solution is extracted, this being due to the fact that the partition coefficient of petroleum ether and water with respect to acetic acid is low. Thus the use of solvents such as benzene and petroleum ether is uneconomic, since very large quantities of the solvent are required.

It has been found that if a mixture of a hydrocarbon, and a solvent for the acid both of lower boiling point than the acid be employed as extracting medium an economic process results, and moreover an acetic acid of much higher concentration than has hitherto been obtainable by means of the solvents alone is produced, for example acetic acid of 90–95% or even up to 100%. Thus for instance if a mixture of ether and petroleum ether be employed an acetic acid of 90–95% or even 100% is obtainable by the ordinary methods of extraction. As the proportion of petroleum ether in such a mixture is progressively increased, so the concentration of the acetic acid obtainable increases.

As hydrocarbons we may use the various paraffins particularly the petroleum fractions termed petroleum ether (boiling point 40–70° C.), gasoline (boiling point 70–90° C.), and kerosene, and benzol etc., while as the solvents ethyl ether, chloroform, acetone oils, etc., may be employed. Preferably the hydrocarbon used should be liquid at ordinary temperature.

Further as particular examples of mixtures which we find suitable for the purpose of the present process, ether and petroleum ether; chloroform and petroleum ether and/or gasoline; acetone oil (boiling point 90–100° C.) and "90% benzol" may be mentioned, though the invention is of course by no means limited to these specific mixtures.

Usually from an economic standpoint there is an optimum proportion or an optimum range of proportions for each specific mixture. Thus in the case of ether and petroleum ether, it will be obvious that the highest concentration acid will not be obtainable with mixtures in which the petroleum ether is present in only small proportions say up to 10% and moreover the process will not be worked most economically if the ether is present in only small proportions. The determination of the optimum proportions or optimum range of proportions is however quite a simple matter. Thus in the case of ether and petroleum ether very good results, both from the point of view of the concentration of the acid obtained, which as stated above may be 90–95% or even 100%, and of economy, are obtainable with an extracting medium consisting of 30–45% of petroleum ether and 70–55% of ether and especially a medium containing 36–40% of petroleum ether and 64–60% of ether.

The acetic acid may be recovered from the extraction product by fractional distillation and in order to obtain as good a separation as possible it is preferred to employ an extraction medium having boiling points, both of the solvent and of the hydrocarbon, as far removed from the boiling point of acetic acid as possible.

The extraction may be carried out in any well known manner, for example by thorough mixing of the acid and the extraction medium and then allowing to separate into layers, or by extraction in a column using the counter-current principle in which case the column may if desired be filled with any suitable packing. If, as will usually be the case, the extracting medium is specifically lighter than the aqueous acid, the latter will be introduced at the top of the column and the medium at the bottom, while the reverse will obtain if the medium is specifically heavier. Either or both the acid and the extracting medium may be introduced into the column through sprays, nozzles or the like. The extraction product may be carried directly to the distilling apparatus and the heat of the vapours of the extracting medium, may be utilized to heat the extraction product before it enters the still. The extracting medium after separation from the extract is returned to the process.

A further method of carrying out the extraction consists in introducing the extraction medium in the form of vapor into the acid still in the liquid form, and in this case it is preferred to employ a solvent and a hydrocarbon having boiling points not too far removed from each other as this facilitates obtaining a mixture of the two vapours in any desired proportions. Alternatively however the solvent and the hydrocarbon may be separately vaporized and introduced in the desired proportions into the conduit leading to the extraction apparatus.

The extraction with vapours may be carried out in a column apparatus, the acid being introduced at the top in the form of a spray and being if desired preheated, while the vapour of the extracting medium is introduced at the bottom. The tower or column is preferably packed with any suitable material so as to obtain good mixing and may also be provided with a heating jacket. In this case again the extraction product may be drawn off directly into the fractionating still and the vapors of the extracting medium may be taken directly from the distilling apparatus to the extraction column to be utilized for extracting further quantities of dilute acid.

The following example is intended to illustrate the invention and is not to be construed as in any way limiting it.

*Example.*—A long extraction column is fitted at its lower end with an inlet for the mixed petroleum ether and ether extracting fluid, the inlet consisting of a jet drilled with a large number of fine holes. Further the bottom of the column is provided with a valve-controlled run-off for the extracted acid. Towards the upper end of the extraction column is the inlet pipe for the aqueous acetic acid to be extracted, the inlet being controlled by a ball valve in accordance with the rate of drawing off the extracted acid at the bottom. The upper part of the column acts as a separating chamber for the mixed liquids and is provided with a sight glass and a constant level overflow. The extract consisting of acetic acid and the mixed ethers drawn off from the upper part of the extraction column passes to any usual type of continuous fractionation apparatus. The strong acetic acid is run off from the base of this apparatus, and the ethers from the top thereof are preferably condensed at a sufficient height to be re-fed to the base of the extraction column by gravity.

The extraction is carried out at ordinary temperature. Initially the extraction column is filled with aqueous acetic acid of about 23% strength. The supply of mixed ethers from a storage vessel containing 70 parts by volume of ethyl ether and 30 parts by volume of petroleum ether (boiling point about 40° C.) is next turned on and when samples of the extracted acid drawn off from the bottom of the column show this acid to be so weak as to be valueless, continuous running off is begun. The extracted acid obtainable by this process contains less than 1% of acetic acid. The extracted acid run off may be heated to recover any ether before running to waste. The strong acetic acid taken from the continuous fractionation apparatus has a concentration of 90–95%. The mixed ethers from the fractionation apparatus which, as explained above are returned to the process, are found to contain 0.1% or less of acetic acid.

Though the process of the invention has been described above chiefly with reference to the concentration of acetic acid, it may be applied to concentrating solutions of other lower aliphatic acids such as propionic acid.

What we claim and desire to secure by Letters Patent is:—

1. Process for concentrating aqueous solutions of lower aliphatic acids, comprising extracting the aqueous solutions with an extracting medium comprising a solvent for the acid and a normally liquid hydrocarbon, both of lower boiling point than the acid.

2. Process for extracting aqueous solutions of lower alipathic acids, comprising extracting the aqueous solutions with an extracting medium comprising a solvent for the acid and a normally liquid hydrocarbon, both of lower boiling point than the acid, the aqueous solution and the extracting medium being caused to pass in counter current through a column.

3. Process for concentrating aqueous solutions of acetic acid, comprising extracting the aqueous solutions with an extracting medium comprising a solvent for the acid and a normally liquid hydrocarbon, both of lower boiling point than the acid.

4. Process for concentrating aqueous solutions of acetic acid, comprising extracting the aqueous solutions with an extracting medium comprising a solvent for the acid and a normally liquid hydrocarbon, both of lower boiling point than the acid, the aqueous solution and the extracting medium being caused to pass in countercurrent through a column.

5. Process for concentrating aqueous solutions of acetic acid, comprising extracting the aqueous solutions with an extracting medium comprising ethyl ether and petroleum ether.

6. Process for concentrating aqueous solutions of acetic acid, comprising extracting the aqueous solutions with an extracting medium comprising ethyl ether and petroleum ether, the aqueous solution and extracting medium being caused to pass in counter current through a column.

7. Process for concentrating aqueous solutions of acetic acid, comprising extracting the aqueous solutions with vapours of an extracting medium comprising a solvent for the acid and a normally liquid hydrocarbon, both of lower boiling point than the acid.

8. Process for concentrating aqueous solutions of acetic acid, comprising extracting the aqueous solutions with vapours of an extracting medium comprising a solvent for the acid and a normally liquid hydrocarbon, both of lower boiling point than the acid, the aqueous solution and extracting medium being caused to pass in counter current through a column.

9. Process for concentrating aqueous solutions of acetic acid, comprising extracting the aqueous solutions with vapours of an extracting medium comprising ethyl ether and petroleum ether.

10. Process for concentrating aqueous solutions of acetic acid, comprising extracting the aqueous solutions with vapours of an extracting medium comprising ethyl ether and petroleum ether, the aqueous solution and extracting medium being caused to pass in counter current through a column.

11. Process for concentrating aqueous solutions of acetic acid, comprising extracting the aqueous solutions with an extracting medium comprising about 70 parts by volume of ethyl ether and about 30 parts by volume of petroleum ether of boiling point about 40° C.

12. Process for concentrating aqueous solutions of acetic acid, comprising extracting the aqueous solutions with an extracting medium comprising about 70 parts by volume of ethyl ether and about 30 parts by volume of petroleum ether of boiling point about 40° C., the aqueous solution and extracting medium being caused to pass in counter current through a column.

13. Process for concentrating aqueous solutions of acetic acid, comprising extracting the aqueous solutions with an extracting medium comprising a solvent for the acid and a normally liquid hydrocarbon, both of lower boiling point than the acid, separating the extracting medium from the extract and returning it to the process.

14. Process for concentrating aqueous solutions of acetic acid, comprising extracting the aqueous solutions with an extracting medium comprising a solvent for the acid and a normally liquid hydrocarbon, both of lower boiling point than the acid, the aqueous solution and extracting medium being caused to pass in counter current through a column, separating the extracting medium from the extract and returning it to the process.

15. Process for concentrating aqueous solutions of acetic acid, comprising extracting the aqueous solutions with an extracting medium comprising ethyl ether and petroleum ether, separating the extracting medium from the extract and returning it to the process.

16. Process for concentrating aqueous solutions of acetic acid, comprising extracting the aqueous solutions with an extracting medium comprising ethyl ether and petroleum ether, the aqueous solution and extracting medium being caused to pass in counter current through a column, separating the extracting medium from the extract and returning it to the process.

17. Process for concentrating aqueous solutions of acetic acid, comprising extracting the aqueous solutions with an extracting medium comprising about 70 parts by volume of ethyl ether and about 30 parts by volume of petroleum ether of boiling point about 40° C., separating the extracting medium from the extract and returning it to the process.

18. Process for concentrating aqueous solutions of acetic acid, comprising extracting the aqueous solutions with an extracting medium comprising about 70 parts by volume of ethyl ether and about 30 parts by volume of petroleum ether of boiling point about 40° C., the aqueous solution and extracting medium being caused to pass in counter current through a column, separating the extracting medium from the extract and returning it to the process.

In testimony whereof we have hereunto subscribed our names.

HENRY DREYFUS.
CLIFFORD IVAN HANEY.